Aug. 22, 1933.     W. M. DEAN     1,923,257
ICE CREAM DIPPER
Filed Sept. 30, 1932
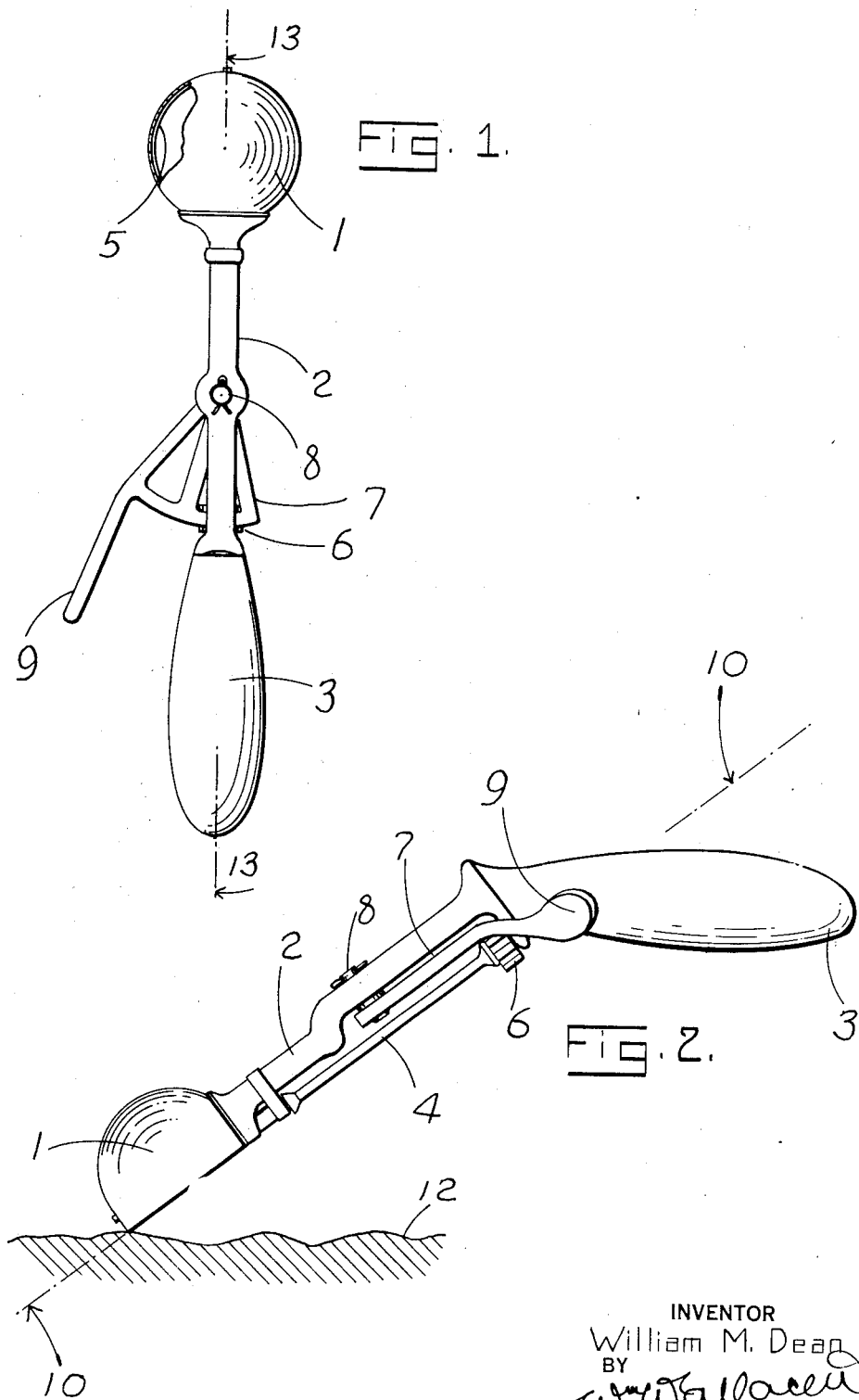
INVENTOR
William M. Dean
BY
Wm Wallace White
ATTORNEY Patented Aug. 22, 1933

1,923,257

UNITED STATES PATENT OFFICE 1,923,257

ICE-CREAM DIPPER

William M. Dean, Oyster Bay, N. Y.

Application September 30, 1932
Serial No. 635,502

5 Claims. (Cl. 107—48)

This invention relates to an improved ice-cream dipper or spoon of the type commonly employed for dispensing ice-cream at soda fountains and elsewhere.

One object of my invention is to provide an improved ice-cream dipper having a crank or lever in the arrangement of the grip whereby the ice-cream may be conveniently and quickly scooped from the container with a minimum of exertion and fatigue. A further object is to provide an ice-cream dipper with a hand grip so constructed as to reduce to a minimum the strain on the wrist and arm of the operator, even when the ice-cream is relatively hard, by providing leverage to facilitate loading of the dipper bowl.

With these and other objects in view, my invention consists in the novel construction hereinafter described, illustrated in the accompanying drawing, and particularly pointed out in the appended claims, it being understood that various changes in the dimensions and proportions of the parts and in minor details may be made without departing from the spirit of the invention or sacrificing any of the advantages thereof.

In the drawing, Fig. 1 is a rear view of the ice-cream dipper; and,

Fig. 2 is a side view of the same in approximate position for application to the ice-cream to be dispensed.

Referring to the accompanying drawing, the dipper comprises a bowl 1 of semi-spherical shape rigidly secured to one end of a handle shank 2, whose opposite end is rigidly secured to a hand grip 3 and the device is preferably provided with ice-cream discharging or releasing means of any suitable or well-known form. In the example shown the handle shank 2 carries a spindle 4 provided with a scraper or bail member 5 mounted in the bowl 1 and adapted to scrape the ice-cream from the interior of such bowl in the well-known manner, while said spindle 4 is operated by means of a pinion 6 secured thereon and actuated by a toothed quadrant formed on a lever 7 pivotally attached to the shank handle at 8 and having a thumb-piece 9 by which it is actuated.

My present invention is characterized by the relative disposition of the parts 2 and 3 and their association with the bowl 1, all for the purpose of providing a hand grip to reduce fatigue and strain to the hand, wrist, or arm of the operator, and so that the device may be conveniently used, even when the ice-cream is of excessive hardness. In the employment of ice-cream dippers having semi-spherical bowls of the above type it is usual for the operator to press and pull the device in order to sink the forward edge of the bowl into the mass of cream and to rock or turn the device in such manner that the sides of the mouth of the bowl cut into the ice-cream to form a ball or sphere of ice-cream which can thus be transferred to a dish or other receiver, but this pressing and pulling and rocking or turning of the device presents considerable difficulties when the ice-cream is relatively hard or stiff, and the straight handle of the ordinary dipper is ill adapted to enable the operator to load the bowl. In the employment of the usual straight grip, rocking or turning of the bowl can be effected only by sheer gripping effort, more especially when the cream is hard.

My improved grip is adapted to facilitate the inserting of the bowl into the cream, the pulling and rocking or cranking of the bowl in the cream, and also the withdrawal of the loaded bowl from the cream.

Unless the usual straight handle is gripped with sufficient firmness it will turn in the hand and will not operate to cut the cream, thus necessitating much exertion and consequent fatigue.

As clearly shown at Fig. 2 of the drawing the handle-shank 2 is arranged in a plane substantially parallel to the plane 10 of the circular mouth of the bowl 1, while the hand-grip 3 is arranged in a plane at right-angles to the plane 10 and lies at an angle of substantially 45° to the said plane 10 and extends through the plane 10 the arrangement being such that the location and the inclination of the hand grip 3 facilitates insertion of the lip of the bowl into the mass of cream 12, after which the device may be conveniently and effectively turned about an axis 13 (Fig. 1) located in the plane 10. This turning movement is effected by a swinging motion of the forearm without depending upon the strength of the wrist, and the tightness of the grip, as is the case when the hand-grip of the dipper is located substantially in and parallel to the axis of rotation.

With modern methods of refrigeration the consistency of the ice-cream is frequently such that the dippers heretofore employed have resulted in extreme fatigue in scooping the ice-cream from the container, resulting of course in slower service and general inefficiency.

My novel construction of handle shank and hand grip very greatly facilitates the operation of scooping the ice-cream from the container and entirely eliminates the possibility of the grip turning in the hand of the operator even when the ice-cream is of excessive hardness. The arrangement and disposition of the hand grip 3 is such that the ice-cream receiving bowl 1 can be very conveniently inserted or pressed into the ice-cream and can be conveniently pulled or turned without tiring the wrist, and the thumb-piece 9 for the operation of the ice-cream releasing member is conveniently located for engagement by the thumb of the hand grasping the member 3.

What I claim is:

1. An ice-cream dipper or spoon comprising a substantially semi-spherical ice-cream receiving bowl, a handle shank secured at one of its ends to said bowl, and a hand grip rigidly secured to the other end of said shank and disposed at an angle of substantially 45° to and below the plane of the circular mouth of the bowl.

2. An ice-cream dipper or spoon of the character described comprising a substantially semi-spherical bowl, a handle shank secured to the bowl and a hand grip secured to said shank, the shank being disposed on one side of the plane of the circular mouth of the bowl, and in a plane passing diametrically through the bowl at right-angles to the first plane, and the hand grip extending downwardly at about 45° to said shank.

3. An ice-cream dipper or spoon of the character described comprising a substantially semi-spherical bowl, a handle shank secured to the bowl and a hand grip secured to said shank, the shank being disposed in a plane passing diametrically through the bowl at right-angles to the plane of the mouth of the bowl, and the hand grip being so disposed that it extends through the latter plane and lies at an angle of 45° thereto.

4. An ice-cream dipper or spoon comprising a handle shank, an open-mouthed bowl on one end of the shank, and a hand grip on the other end thereof, the shank being disposed on one side of the plane of the mouth of the said bowl, while the hand-grip extends through said plane and is disposed mainly on the opposite side thereof to facilitate pulling and inserting of the lip of the bowl in the mass of cream and to facilitate turning of the dipper about its axis.

5. An ice-cream dipper or spoon comprising a handle shank, an open-mouthed bowl at one end of the shank, and a hand grip at the other end thereof, the shank being disposed on one side of the plane of the mouth of the said bowl and parallel thereto while the hand-grip extends through said plane at an angle of about 45° thereto and is disposed mainly on the opposite side thereof to facilitate turning by cranking of the dipper about its axis.

WILLIAM M. DEAN.